US012690021B2

(12) United States Patent
Cozzo et al.

(10) Patent No.: US 12,690,021 B2
(45) Date of Patent: Jul. 21, 2026

(54) METHOD AND APPARATUS FOR TRANSMISSIONS OVER MULTIPLE SLOTS IN DUPLEX MODE

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 18/190,869

(22) Filed: Mar. 27, 2023

(65) Prior Publication Data

US 2023/0328706 A1 Oct. 12, 2023

Related U.S. Application Data

(60) Provisional application No. 63/443,263, filed on Feb. 3, 2023, provisional application No. 63/328,546, filed on Apr. 7, 2022.

(51) Int. Cl.
*H04W 72/0453* (2023.01)
*H04L 5/14* (2006.01)

(52) U.S. Cl.
CPC ........... *H04W 72/0453* (2013.01); *H04L 5/14* (2013.01)

(58) Field of Classification Search
CPC ........... H04W 72/0453; H04W 52/146; H04W 72/0446; H04W 72/1268; H04L 5/14;
(Continued)

(56) References Cited

U.S. PATENT DOCUMENTS

2019/0052421 A1 2/2019 Yin et al.
2019/0372736 A1 12/2019 Chang et al.
(Continued)

FOREIGN PATENT DOCUMENTS

WO 2020150111 A1 7/2020
WO 2021161269 A1 8/2021

OTHER PUBLICATIONS

International Search Report and Written Opinion issued Jul. 7, 2023 regarding International Application No. PCT/KR2023/004571, 7 pages.

(Continued)

*Primary Examiner* — Yu-Wen Chang

(57) ABSTRACT

Apparatuses and methods for transmissions over multiple slots in duplex mode. A method includes receiving information for first slots that include first uplink (UL) symbols associated with first frequency resources of a sub-band (SB), second slots that include second UL symbols associated with second frequency resources of a bandwidth (BW), and transmission of a channel over a first number of slots including slots from the first slots and the second slots. The method further includes determining a first set of frequency resources within the SB for transmission of the channel over the first slots and a second set of frequency resources within the BW for transmission of the channel over the second slots. The method further includes transmitting the channel in the first set of frequency resources within the SB over the first slots and in the second set of frequency resources within the BW over the second slots.

17 Claims, 10 Drawing Sheets

1100

1110 UE is configured a first number of slots as XDD slots, wherein a first sub-band is for UL and a second sub-band is for DL, and a second number of slots as DL slots 1120 UE is configured/indicated to transmit a PUSCH with K repetitions, wherein K is larger than the first number of slots, and is configured with DM-RS bundling 1130 UE receives a DCI format including an UL indication for the first sub-band for each slot over the second number of slots 1140 UE transmits PUSCH repetitions over the first number of slots in frequency resources of the first sub-band using a first transmit power 1150 UE transmits PUSCH repetitions over the second number of slots using a second transmit power

(58) Field of Classification Search

CPC ..... H04L 1/189; H04L 1/1822; H04L 1/1854; H04L 1/1896; H04L 5/0044; H04L 5/001; H04L 5/0051; H04L 5/0092; H04L 5/0094; H04L 5/0005

See application file for complete search history.

(56) References Cited

U.S. PATENT DOCUMENTS

| | | | |
|---|---|---|---|
| 2020/0037298 A1 | 1/2020 | Shi et al. | |
| 2021/0377938 A1 | 12/2021 | Huang et al. | |
| 2022/0053550 A1 | 2/2022 | Li et al. | |
| 2023/0239122 A1* | 7/2023 | Xiong | H04B 1/7143 |
| | | | 370/280 |
| 2023/0284188 A1* | 9/2023 | Abotabl | H04L 5/14 |
| 2024/0063984 A1* | 2/2024 | Yao | H04L 1/1861 |
| 2024/0155591 A1* | 5/2024 | Ibrahim | H04L 5/0092 |
| 2024/0163011 A1* | 5/2024 | Hasegawa | H04L 1/0071 |
| 2024/0430060 A1* | 12/2024 | Elshafie | H04W 52/38 |
| 2025/0105993 A1* | 3/2025 | Li | H04W 72/1263 |

OTHER PUBLICATIONS

Nokia, "Introduction of NR coverage enhancements", 3GPP TSG RAN WG1 Meeting #107-e, R1-2112480, Nov. 2021, 28 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"5G; NR; Radio Resource Control (RRC); Protocol specification (3GPP TS 38.331 version 16.7.0 Release 16)", ETSI TS 138 331 V16.7.0, Jan. 2022, 950 pages.

"5G; NR; Medium Access Control (MAC) protocol specification (3GPP TS 38.321 version 16.7.0 Release 16)", ETSI TS 138 321 V16.7.0, Jan. 2022, 160 pages.

Extended European Search Report issued Apr. 9, 2025 regarding Application No. 23784984.9, 8 pages.

Office Action issued May 29, 2026, in connection with Indian Patent Application No. 202417062522, 7 pages.

"5G; NR; Physical layer procedures for data (3GPP TS 38.214 version 16.7.0 Release 16)," ETSI TS 138 214 V16.7.0, Oct. 2021, 176 pages.

* cited by examiner

600

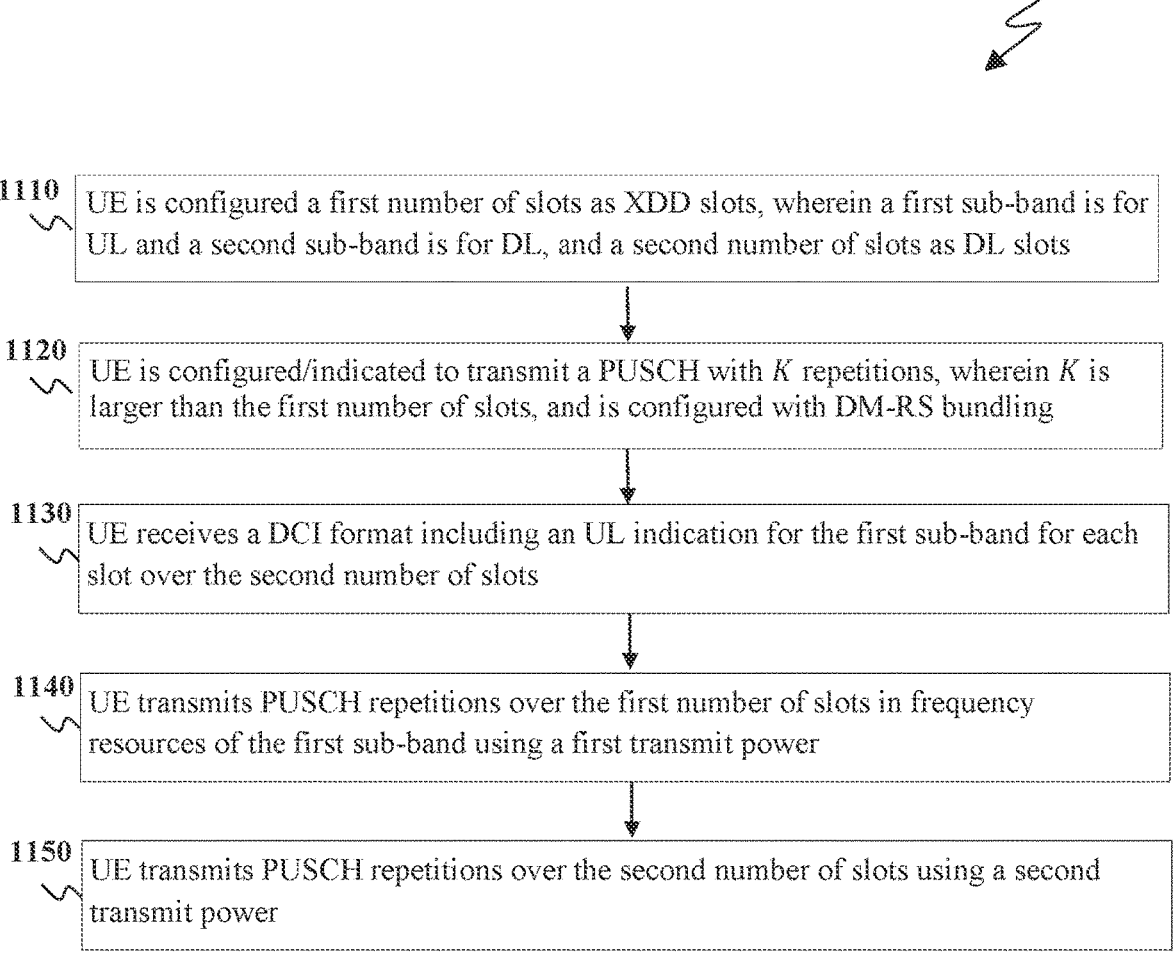

1100

1110 UE is configured a first number of slots as XDD slots, wherein a first sub-band is for UL and a second sub-band is for DL, and a second number of slots as DL slots 1120 UE is configured/indicated to transmit a PUSCH with $K$ repetitions, wherein $K$ is larger than the first number of slots, and is configured with DM-RS bundling 1130 UE receives a DCI format including an UL indication for the first sub-band for each slot over the second number of slots 1140 UE transmits PUSCH repetitions over the first number of slots in frequency resources of the first sub-band using a first transmit power 1150 UE transmits PUSCH repetitions over the second number of slots using a second transmit power

FIG. 11

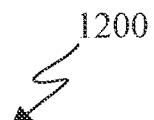

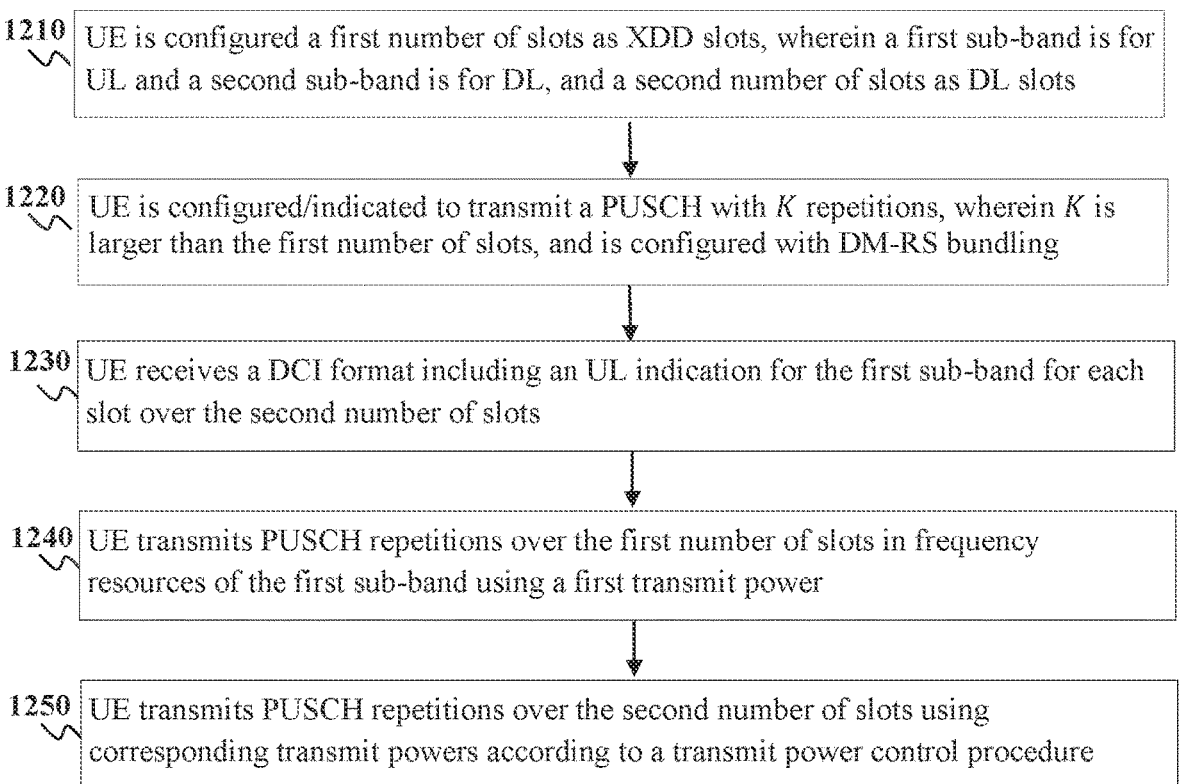

1210    UE is configured a first number of slots as XDD slots, wherein a first sub-band is for UL and a second sub-band is for DL, and a second number of slots as DL slots 1220    UE is configured/indicated to transmit a PUSCH with $K$ repetitions, wherein $K$ is larger than the first number of slots, and is configured with DM-RS bundling 1230    UE receives a DCI format including an UL indication for the first sub-band for each slot over the second number of slots 1240    UE transmits PUSCH repetitions over the first number of slots in frequency resources of the first sub-band using a first transmit power 1250    UE transmits PUSCH repetitions over the second number of slots using corresponding transmit powers according to a transmit power control procedure

FIG. 12

METHOD AND APPARATUS FOR TRANSMISSIONS OVER MULTIPLE SLOTS IN DUPLEX MODE

CROSS-REFERENCE TO RELATED APPLICATION AND CLAIM OF PRIORITY

This application claims priority under 35 U.S.C. § 119(e) to U.S. Provisional Patent Application No. 63/328,546 filed on Apr. 7, 2022, and U.S. Provisional Patent Application No. 63/443,263 filed on Feb. 3, 2023. The above-identified provisional patent applications are hereby incorporated by reference in their entirety.

TECHNICAL FIELD

The present disclosure relates generally to wireless communication systems and, more specifically, to transmissions over multiple slots in duplex mode.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to apparatuses and methods for transmissions over multiple slots in duplex mode.

In one embodiment, a user equipment (UE) is provided. The UE includes a transceiver configured to receive information for first slots that include first uplink (UL) symbols associated with first frequency resources of a sub-band (SB), second slots that include second UL symbols associated with second frequency resources of a bandwidth (BW), wherein the BW includes the SB, and transmission of a channel over a first number of slots including slots from the first slots and the second slots. The UE further includes a processor operably coupled to the transceiver, the processor configured to determine a first set of frequency resources within the SB for transmission of the channel over at least one slot from the first slots, and a second set of frequency resources within the BW for transmission of the channel over at least one slot from the second slots. The transceiver is further configured to transmit the channel in the first set of frequency resources within the SB over the at least one slot from the first slots and in the second set of frequency resources within the BW over the at least one slot from the second slots.

In another embodiment, a base station (BS) is provided. The BS includes a transceiver configured to transmit information for first slots that include first UL symbols associated with first frequency resources of a SB, second slots that include second UL symbols associated with second frequency resources of a BW wherein the BW includes the SB, and reception of a channel over a first number of slots including slots from the first slots and the second slots. The BS further includes a processor operably coupled to the transceiver. The processor is configured to determine a first set of frequency resources within the SB for reception of the channel over at least one slot from the first slots and a second set of frequency resources within the BW for reception of the channel over at least one slot from the second slots. The transceiver is further configured to receive the channel in the first set of frequency resources within the SB over the at least one slot from the first slots and in the second set of frequency resources within the BW over the at least one slot from the second slots.

In yet another embodiment, a method is provided. The method includes receiving information for first slots that include first UL symbols associated with first frequency resources of a SB, second slots that include second UL symbols associated with second frequency resources of a BW, wherein the BW includes the SB, and transmission of a channel over a first number of slots including slots from the first slots and the second slots. The method further includes determining a first set of frequency resources within the SB for transmission of the channel over at least one slot from the first slots and a second set of frequency resources within the BW for transmission of the channel over at least one slot from the second slots. The method further includes transmitting the channel in the first set of frequency resources within the SB over the at least one slot from the first slots and in the second set of frequency resources within the BW over the at least one slot from the second slots.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example method for a UE to determine a physical uplink shared channel (PUSCH) transmission with repetitions when demodulation reference signal (DM-RS) bundling is enabled, and a slot format is indicated in a downlink control information (DCI) format according to embodiments of the present disclosure; and FIG. 12 illustrates an example method for a UE to determine a PUSCH transmission with repetitions over slots with a slot format indicated by a DCI format according to embodiments of the present disclosure.

DETAILED DESCRIPTION

Figure 1:
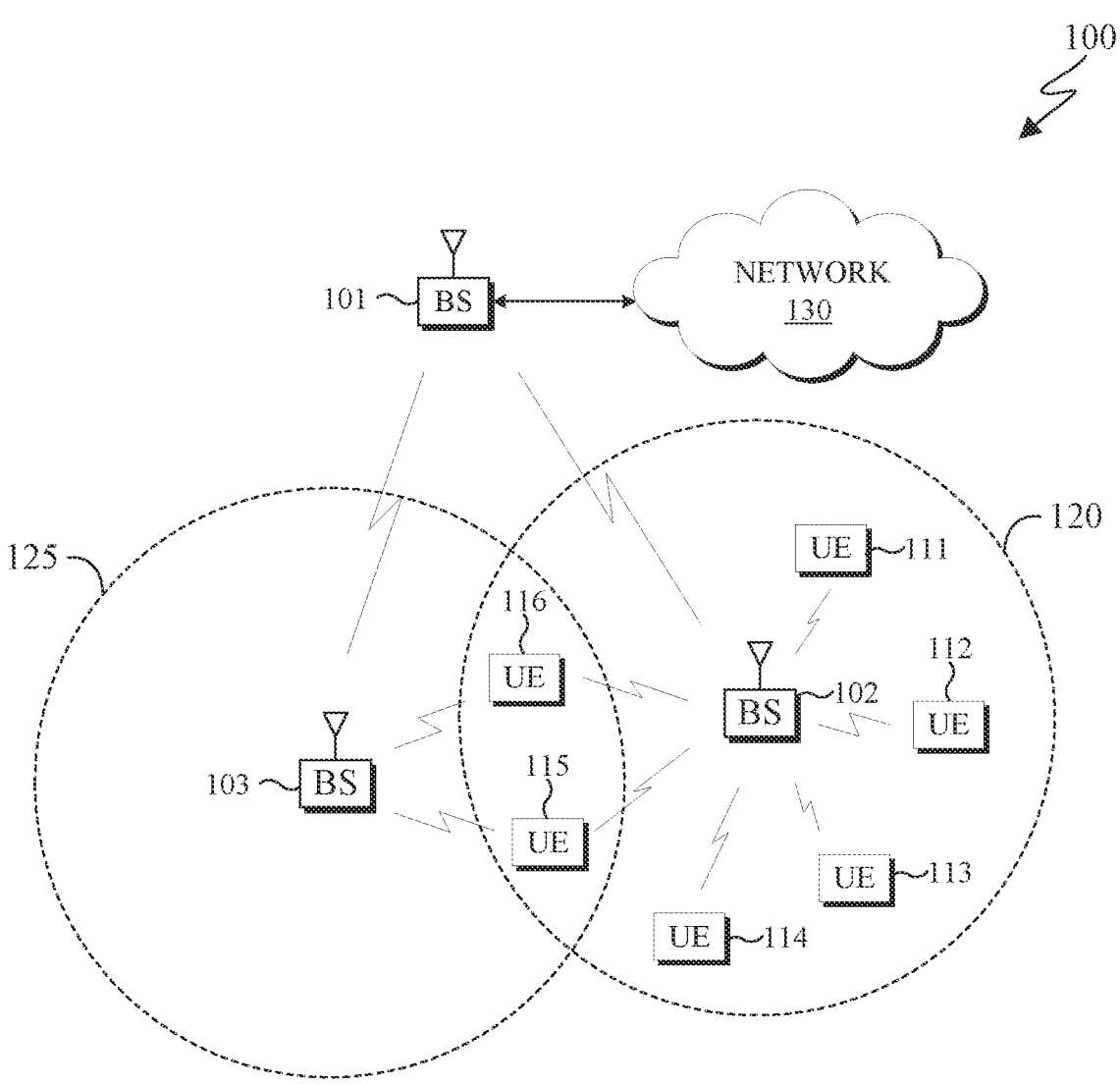
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.0.0, "NR, Physical Channels and Modulation" (herein "REF 1"); 3GPP TS 38.212 v17.0.0, "NR, Multiplexing and channel coding" (herein "REF 2"); 3GPP TS 38.213 v17.0.0, "NR, Physical Layer Procedures for Control" (herein "REF 3"); 3GPP TS 38.214 v17.0.0; "NR, Physical Layer Procedures for Data" (herein "REF 4"); and 3GPP TS 38.331 v16.7.0; "NR, Radio Resource Control (RRC) Protocol Specification" (herein "REF 5"); and 3GPP TS 38.321 v16.7.0, "NR; Medium Access Control (MAC) protocol specification" ("REF 6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
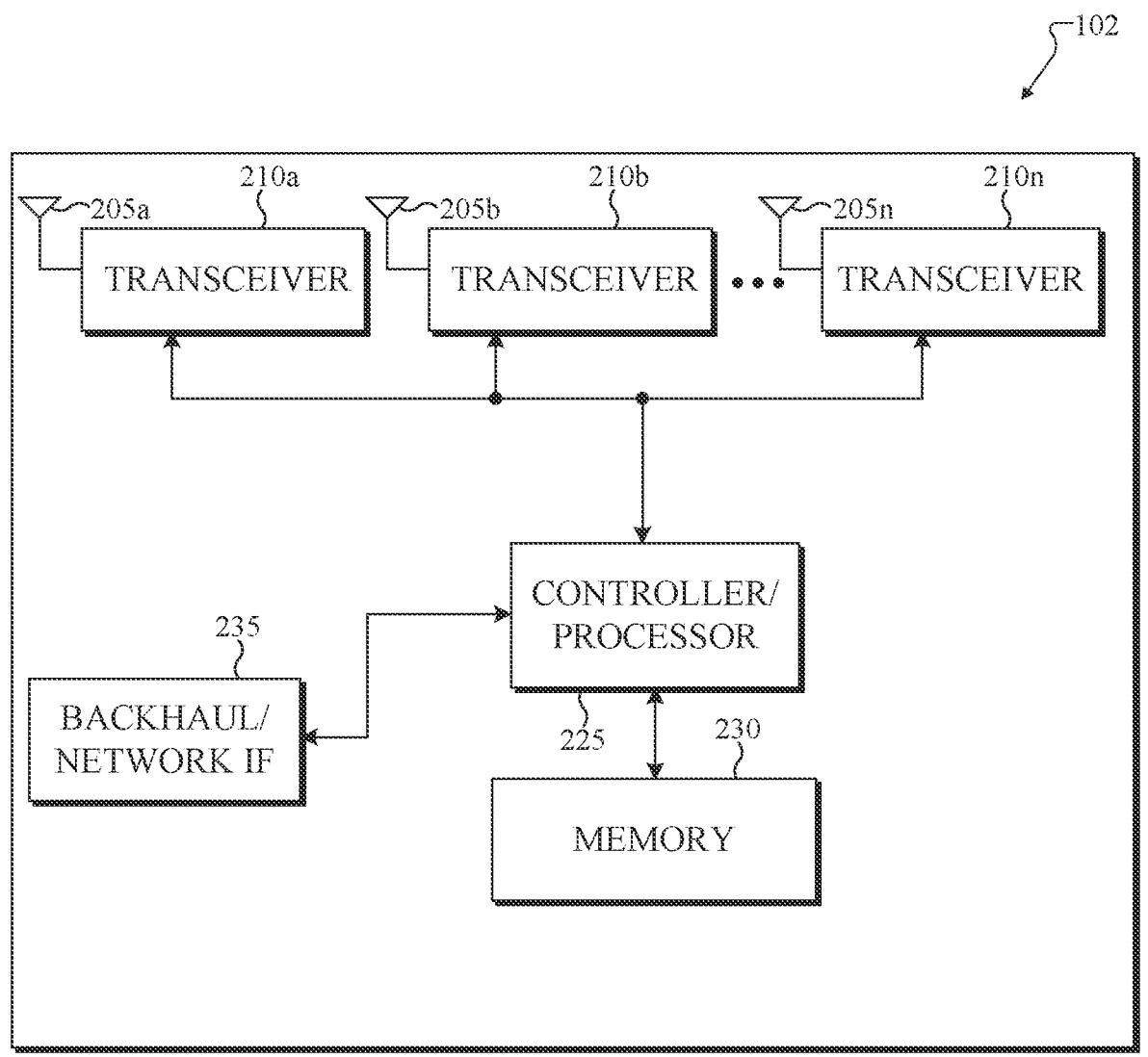
FIG. 2 illustrates an example gNodeB (gNB) according to embodiments of the present disclosure.
Figure 3:
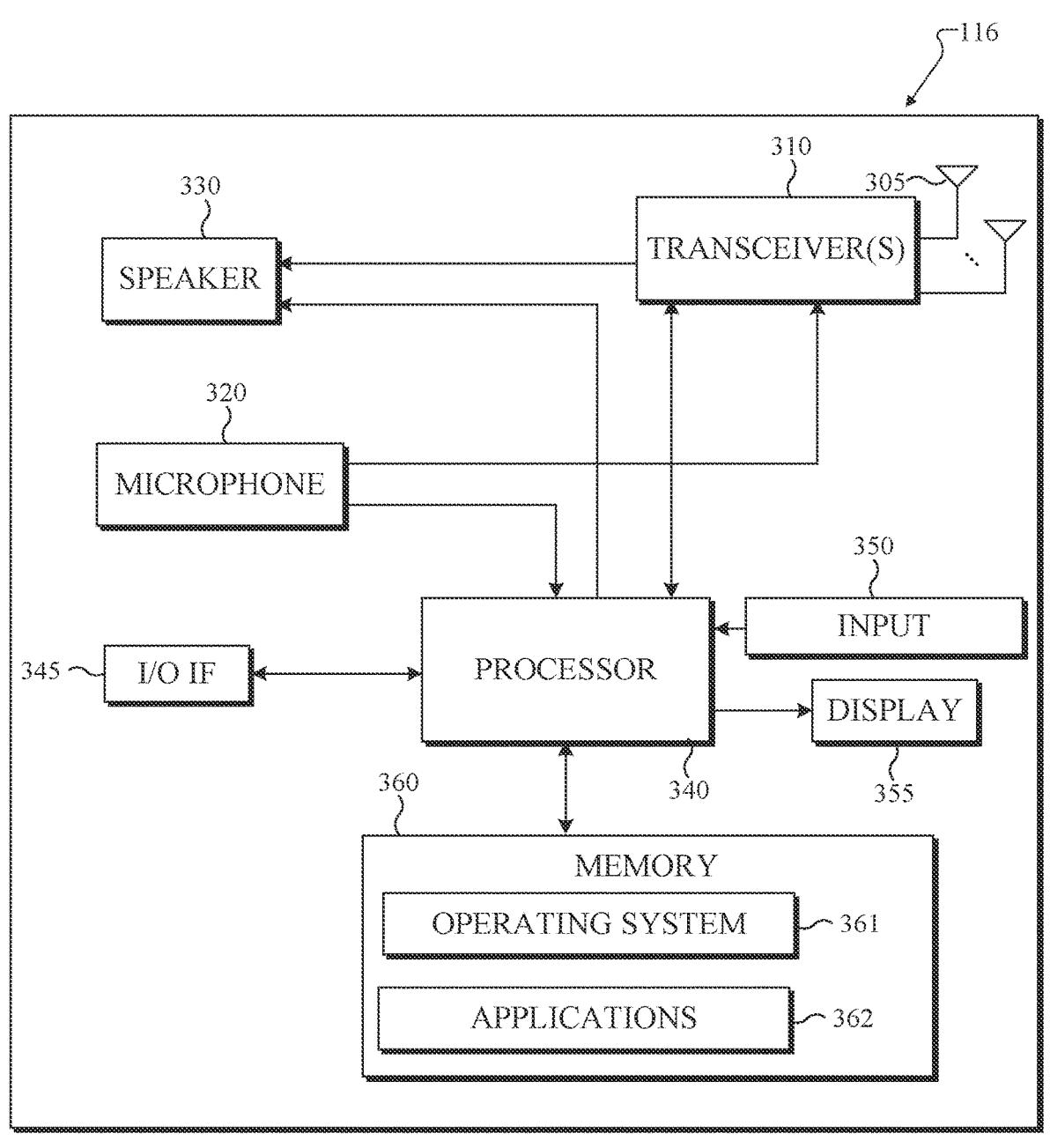
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for transmissions over multiple slots in duplex mode. In certain embodiments, one or more of the BSs 101-103 include circuitry, programing, or a combination thereof for receptions over multiple slots in duplex mode.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for the UE to transmit over multiple slots in duplex mode. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for transmissions over multiple slots in duplex mode. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
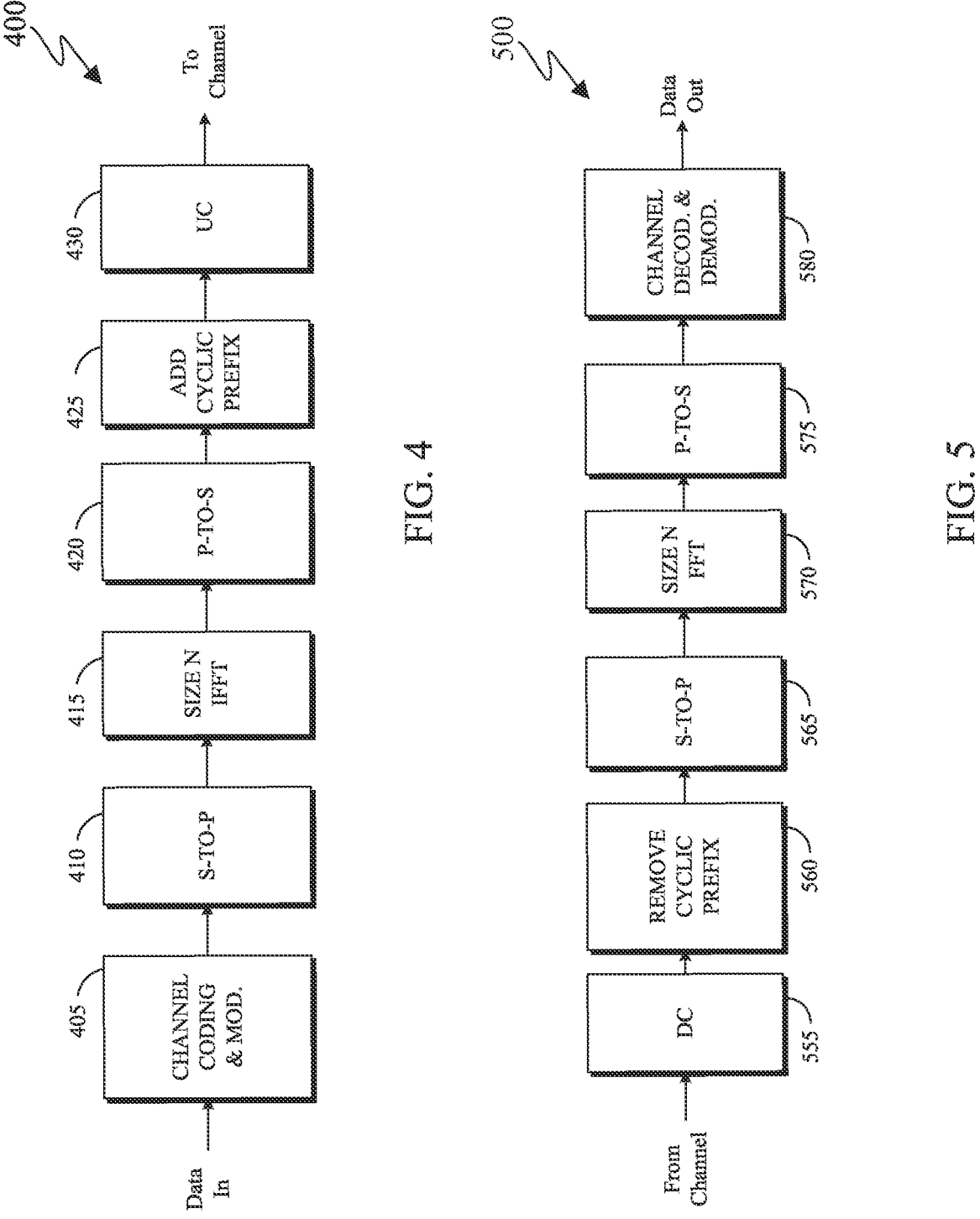
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support timing aspects for random access with multiple beams as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration μ as $2^{\mu} \cdot 15$ kHz. A unit of one sub-carrier over one symbol is referred to as resource element (RE). A unit of one RB over one symbol is referred to as physical RB (PRB).

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception and a redundancy version (RV) that is indicated by a RV field in the DCI format when incremental redundancy is used for encoding the TB. A TB transmission can be an initial one or a retransmission as identified by a new data indicator (NDI) field in the DCI format scheduling a PDSCH reception that provides a TB retransmission for a given HARQ process number.

A gNB transmits one or more of multiple types of RS including channel state information RS (CSI-RS) and demodulation RS (DM-RS)—see also REF 1. A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF 3). The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB (see also REF 5). A DM-RS is typically transmitted only within a BW of a respective PDCCH or PDSCH and a UE can use the DM-RS to demodulate data or control information.

A UE typically monitors multiple candidate locations for respective potential PDCCH receptions to decode multiple DCI formats in a slot, for example as described in REF 3. A DCI format includes cyclic redundancy check (CRC) bits in order for the UE to confirm a correct detection of the DCI format. A DCI format type is identified by a radio network temporary identifier (RNTI) that scrambles the CRC bits (see also REF 2).

For a DCI format scheduling a PDSCH or a PUSCH to a single UE, the RNTI can be a cell RNTI (C-RNTI), or a configured scheduling RNTI (CS-RNTI), or an MCS-C-RNTI and serves as a UE identifier. In the following, for brevity, only the C-RNTI will be referred to when needed. A UE typically receives/monitors PDCCH for detections of DCI formats with CRC scrambled by a C-RNTI according to a UE-specific search space (USS). For a DCI format 0_0 and a DCI format 1_0 that schedule PUSCH transmissions and PDSCH receptions, respectively, to a UE, the UE can additionally be configured to monitor corresponding PDCCH according to common search space (CSS). For a DCI format 0_1 and a DCI format 0_2 that are mainly used to schedule PUSCH transmissions or for a DCI format 1_1 and a DCI format 1_2 that are mainly used to schedule PDSCH receptions, the UE monitors corresponding PDCCH according to a USS. PDCCH monitoring implies reception of PDCCH candidates and decoding of potential DCI formats.

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 2_2 providing transmit power control (TPC) commands for PUSCH or PUCCH transmissions, a DCI format 2_3 providing TPC commands for SRS transmissions and also potentially triggering a SRS transmission on a number of cells, and so on, and a corresponding CSS is referred to as Type3-PDCCH CSS.

UL signals also include data signals conveying information content, control signals conveying UL control information (UCI), DM-RS associated with data or UCI demodulation, phase-tracking RS (PT-RS) used for phase tracking in symbols of a PUSCH, and sounding RS (SRS) enabling a gNB to perform UL channel measurement, and a random access (RA) preamble enabling a UE to perform random access (see also REF 1). A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UL RS includes DM-RS, PT-RS, and SRS. DM-RS is typically transmitted within a BW of a respective PUSCH or PUCCH. A gNB can use a DM-RS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

UCI includes hybrid automatic repeat request acknowledgement (HARQ-ACK) information, indicating correct or incorrect decoding of TBs or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE transmits a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value.

DL receptions and UL transmissions by a UE can be configured to occur in a corresponding DL bandwidth part (BWP) and UL BWP. A DL/UL BWP is smaller than or equal to a DL/UL bandwidth of a serving cell. DL transmissions from a gNB and UL transmissions from a UE can be based on an orthogonal frequency division multiplexing (OFDM) waveform including a variant using DFT precoding that is known as DFT-spread-OFDM (see also REF 1).

Various embodiments of the present disclosure provide transmission of a channel with repetitions or of a transport block over multiple slots for a UE capable of operating in duplex mode. Various embodiments of the present disclosure provide a mechanism for determining a time-frequency window for DM-RS bundling. Various embodiments of the present disclosure provide a mechanism for configuring a DM-RS bundling operation in duplex mode. Various embodiments of the present disclosure provide a mechanism for determining a time-frequency window for DM-RS bundling with a dynamic slot format indication.

Embodiments in this disclosure described for PUSCH transmission equally apply to other uplink transmissions, wherein the uplink transmission is dynamically scheduled by a DCI format or by a RAR uplink grant or semi-statically configured, or is a PUSCH transmission with PUSCH type A or type B repetitions, or is a PUSCH transmission of a transport block over multiple slots (TBoMS), or is a PUCCH transmission with or without repetitions.

A slot format includes downlink symbols, uplink symbols, and flexible symbols. If a UE is provided tdd-UL-DL-ConfigurationCommon, the UE sets the slot format per slot over a number of slots as indicated by tdd-UL-DL-ConfigurationCommon. If the UE is additionally provided tdd-UL-DL-ConfigurationDedicated, the parametertdd-UL-DL-ConfigurationDedicated overrides only flexible symbols per slot over the number of slots as provided by tdd-UL-DL-ConfigurationCommon. A slot configuration period and a number of downlink symbols, uplink symbols, and flexible symbols in each slot of the slot configuration period are determined from tdd-UL-DL-ConfigurationCommon and tdd-UL-DL-ConfigurationDedicated and are common to each configured BWP. A UE considers symbols in a slot indicated as downlink by tdd-UL-DL-ConfigurationCommon, or tdd-UL-DL-ConfigurationDedicated to be available for receptions and considers symbols in a slot indicated as uplink by tdd-UL-DL-ConfigurationCommon, or by tdd-UL-DL-ConfigurationDedicated to be available for transmissions.

An NR TDD component carrier (CC) is a single carrier that uses a same frequency band for the uplink and the downlink. TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, a dynamic adaptation of link direction has been considered where, with the exception of some symbols in some slots supporting predetermined transmissions such as for SSBs, symbols of a slot can have a flexible direction (UL or DL) that a UE can determine according to scheduling information for transmissions or receptions. A PDCCH can also be used to provide a DCI format, such as a DCI format 2_0 as described in REF 3, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross-link interference (CLI) where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with full-duplex mode even when a UE still operates in half-duplex mode, such as when the UE can either transmit or receive at a same time, or the UE can also be capable for full-duplex operation.

Full-duplex transmission/reception is not limited to gNBs, TRPs, or UEs, but can also be used for other types of wireless nodes such as relay or repeater nodes.

Full duplex operation needs to overcome several challenges in order to be functional in actual deployments. When using overlapping frequency resources, received signals are subject to co-channel cross-link interference (CLI) and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Full-duplex operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), or DDDDDDD-SUU (5 msec), the UL-DL configurations allow for an DL:UL ratio from 3:1 to 4:1. Any UL transmission can only occur in a limited number of UL slots, for example every 2, 2.5, or 5 msec, respectively.

Throughout the disclosure, a UE operating in full-duplex (FD) or half-duplex (HD) mode, or in sub-band full duplex or in sub-band non-overlapping full duplex (SBFD) mode, is also referred as an XDD UE or as a SBFD UE or a SBFD aware UE. The terms "full-duplex", "half-duplex", "sub-band full duplex", "sub-band non-overlapping full duplex" and "XDD" are used interchangeably in this disclosure to refer to simultaneous DL and UL operation within a TDD carrier by using different TDD configurations across different frequency regions of a BWP, or across different sub-bands of one or more BWP, or also different frequency regions of different BWPs, wherein a frequency region can comprise part or all of the subcarriers of a BWP.

Figure 6:
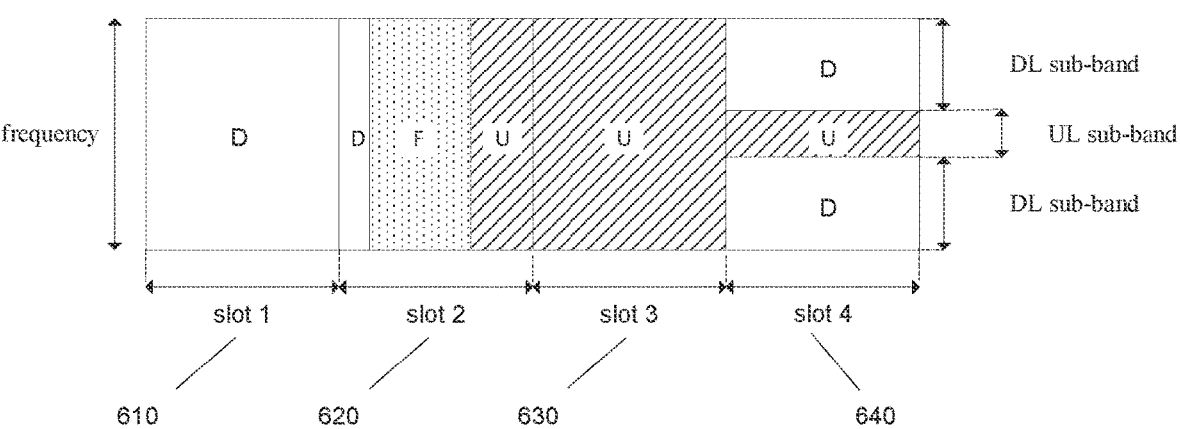
FIG. 6 illustrates an example of a slot according to embodiments of the present disclosure.

FIG. 6 illustrates an example of a slot 600 according to embodiments of the present disclosure. The embodiment of the example of a slot 600 illustrated in FIG. 6 is for illustration only. FIG. 6 does not limit the scope of the present disclosure to any particular implementation of the example of a slot 600.

When a UE operates in TDD mode and is provided a TDD UL-DL configuration, a slot can be a downlink slot with all downlink symbols, or an uplink slots with all uplink symbols, or a slot with downlink, and/or flexible symbols, and/or uplink symbols. As illustrated in FIG. 6, a slot can be configured with all downlink symbols 610, or with downlink symbols, flexible symbols and uplink symbols 620, or with all uplink symbols 630, wherein each symbol comprises any of the frequency resources in a configured BWP. When a UE operates in XDD mode, a slot can be also configured with sub-bands of a BWP 640, wherein each symbol of the slot can be either a DL symbol in the DL sub-band or an UL symbol in the UL sub-band. The slot where there is at least one sub-band for UL and one sub-band for DL is called an XDD slot or an X slot or an SBFD slot or an SB slot. One or more sub-bands for uplink and one or more sub-bands for downlink can occupy different parts of a BWP. For example, a sub-band for uplink can occupy the middle portion of the BWP and the downlink sub-bands can occupy the lower and higher parts of a BWP. Uplink and downlink sub-bands can have different sizes.

Throughout the present disclosure, an operation in non-XDD mode refers to a UE that is configured an UL-DL TDD slot format configuration and can transmit/receive a symbol in any of the frequency resources of active UL/DL BWPs; and an operation in XDD mode refers to a UE that is configured an XDD or SBFD or SB slot format configuration that can include UL, DL or XDD or SBFD or SB slots.

A UE can operate in XDD or SBFD mode during connected mode and/or initial access or for some steps of a random access (RA) procedure. While a RA procedure in non-XDD mode allows sharing of time and frequency resources among XDD and non-XDD UEs in a cell and reduces system resource fragmentation, operating some or all steps of the RA procedure in XDD mode has the advantage of flexible resource allocation and optimization of UE-specific signaling by allowing simultaneous UL and DL transmissions in different frequency regions or sub-bands of a BWP.

A UE can also operate in XDD or SBFD mode with different configurations in different time periods. An adaptation over time of an XDD configuration is helpful to mitigate the interference level in a cell and enhance scheduling flexibility. Different sub-bands of a BWP and/or different BWPs, or also different CCs, can be configured for UL or DL in different time periods depending on the load in the cell and on UE capabilities to operate in FD, HD or XDD mode.

For applications that do not require small latency or large data rates, a typical approach to improve coverage is to increase a transmission time; that is, a physical signal or channel can be transmitted over a number of time units corresponding to a number of repetitions or retransmissions. When a UE is in extreme coverage limiting situation, such as when the UE experiences large path loss, relying on repetitions can improve coverage while maintaining an efficient network operation.

When a UE is scheduled to transmit a physical uplink shared channel (PUSCH) that provides a transport block, a value m of a time domain resource assignment (TDRA) field in a downlink control information (DCI) format scheduling the PUSCH transmission provides a row index m+1 to an allocated table. The DCI format is provided in a physical downlink control channel (PDCCH) reception. The indexed row defines a slot offset $K_2$ for the PUSCH transmission after a slot of the PDCCH reception, possibly after further adjusting by the sub-carrier spacing (SCS) configurations for the PDCCH and the PUSCH, the start and length indicator SLIV, or directly the start symbol S and the symbol allocation length L for the PUSCH transmission, the PUSCH mapping type, and the number of repetitions (if number of repetitions is present in the resource allocation table) for the PUSCH transmission.

For PUSCH repetition Type A, the starting symbol S relative to the start of the slot, and the number of consecutive symbols L counting from the symbol S that is allocated for the PUSCH are determined from the start and length indicator value, SLIV, of the indexed row. When a UE transmits a PUSCH that is scheduled by a DCI format, the UE determines a number of repetitions K from the resource allocation table if higher layer parameter numberofrepetitions is present; otherwise, from a value of higher layer parameter pusch-AggregationFactor. In the following, for brevity, an italicized parameter name refers to a higher layer parameter. The UE repeats the PUSCH transmission across the K consecutive slots by applying a same symbol allocation in each slot. The UE transmits a repetition of the PUSCH transmission in a slot only when L consecutive symbols in the slot, starting from symbol S, are not downlink (DL) symbols. For PUSCH repetition Type B, the starting symbol S relative to the start of the slot, and the number of consecutive symbols L counting from the symbol S allocated for the PUSCH, are provided by startSymbol and length of the indexed row of the resource allocation table, respectively. The number of nominal repetitions is given by numberofrepetitions.

A UE can also repeat a transmission of a physical uplink control channel (PUCCH) in order to improve a reception reliability of uplink control information (UCI) provided by the PUCCH, wherein a repetition of the PUCCH transmission in each slot starts from a same symbol in the slot and is over a same number of consecutive symbols. When there are not enough available symbols in a slot for a repetition of the PUCCH transmission, or when the repetition cannot start from a configured or indicated first symbol, or when the repetition cannot occur in consecutive symbols of a slot, the UE does not transmit the PUCCH repetition in the slot, the UE defers the repetition to a subsequent slots and does not count the slot in the number of configured or indicated slots for repetitions of a PUCCH transmission.

A UE includes a demodulation reference signal (DM-RS) in a physical uplink data channel (PUSCH) or in a physical uplink control channel (PUCCH) transmission in order to enable a receiver at a serving gNB to coherently demodulate modulated data information symbols or control information symbols in the PUSCH or in the PUCCH, respectively. The DM-RS is typically located in the earlier symbols of a PUSCH or PUCCH transmission to avoid a demodulation delay due to a processing time for obtaining a channel estimate to be used for the coherent demodulation of data/control symbols under the assumption of phase coherence among the DM-RS and the data/control symbols.

Inaccurate channel estimation can significantly degrade reception reliability of data/control information. A way to improve an accuracy of channel estimates is to filter multiple DM-RS across slots of an uplink transmission. In order to enable filtering over multiple DM-RS, a power and phase of the filtered DM-RS needs to remain practically same and that also applies to the power and phase of modulated data/control information symbols, for example in case of QAM modulation, in order to perform demodulation using the filtered DM-RS. Thus, when a UE is scheduled to transmit a PUSCH with repetitions over a number of slots, the conditions that the UE should apply to maintain a same power and phase over a time period where the PUSCH repetitions are transmitted, include for the UE to not apply accumulated TPC commands (or parameters) or for the UE to maintain a same precoding or spatial filter for the repetitions.

When a UE is configured for operation in duplex mode, PUSCH repetitions can be transmitted in UL slot or in XDD slots. PUSCH repetitions can be transmitted in non-consecutive slots due to unavailability of time-frequency resources in some slots. For example, a slot may not include enough consecutive UL symbols for a PUSCH or PUCCH repetition, or may not be available for UL transmission by configuration or by means of a dynamic indication such as scheduling of a higher priority transmission, indication of a cancellation or indication of a slot as DL slot. In order to enable filtering over multiple DM-RS, frequencies resources used in each repetition would be determined by the UL sub-band of the XDD. Depending on the UL sub-band and on the number of slots or symbols between two consecutive repetitions, referred as the transmission gap, the UE may not be able to maintain phase continuity over a transmission gap larger than a certain number of symbols or slots.

There would be more opportunities to schedule repetitions in consecutive slots for operation in duplex mode because a sub-band of the configured BWP in DL slots can be used for UL transmissions. As the time window (e.g., nominal time domain window) over which DM-RS filtering increases, DM-RS symbols may not be mapped in every slot and/or DM-RS density can be reduced. When the channel changes slowly it is possible to do DM-RS filtering over a longer time period and the enhanced accuracy of channel estimates allows to reduce the density of DM-RS symbols that in turn helps to improve PUSCH performance by using a lower coding rate. To maintain phase continuity across the PUSCH repetitions during the window for DM-RS filtering, the number of symbols between two consecutive DM-RS should not exceed a certain value.

Therefore, for operation in duplex mode there is a need to determine a time-frequency window for DM-RS bundling. There is another need to determine the time-frequency window for DM-RS bundling in presence of a dynamic indication of a slot format in a sub-band of the BWP. There is also another need to determine a transmit power for repetitions within the time-frequency window and when the window changes.

Throughout the present disclosure, although some descriptions consider a PUSCH transmission with repetitions, a same UE procedure can apply to a PUCCH transmission with repetitions, to a PUSCH transmission with a transport block (TB) processing over multiple slots or to a combination of the above.

Throughout the present disclosure, although some descriptions consider a PUSCH transmission with DM-RS bundling operation, some procedures also apply when DM-RS bundling operation is not configured or not enabled.

Figure 7:
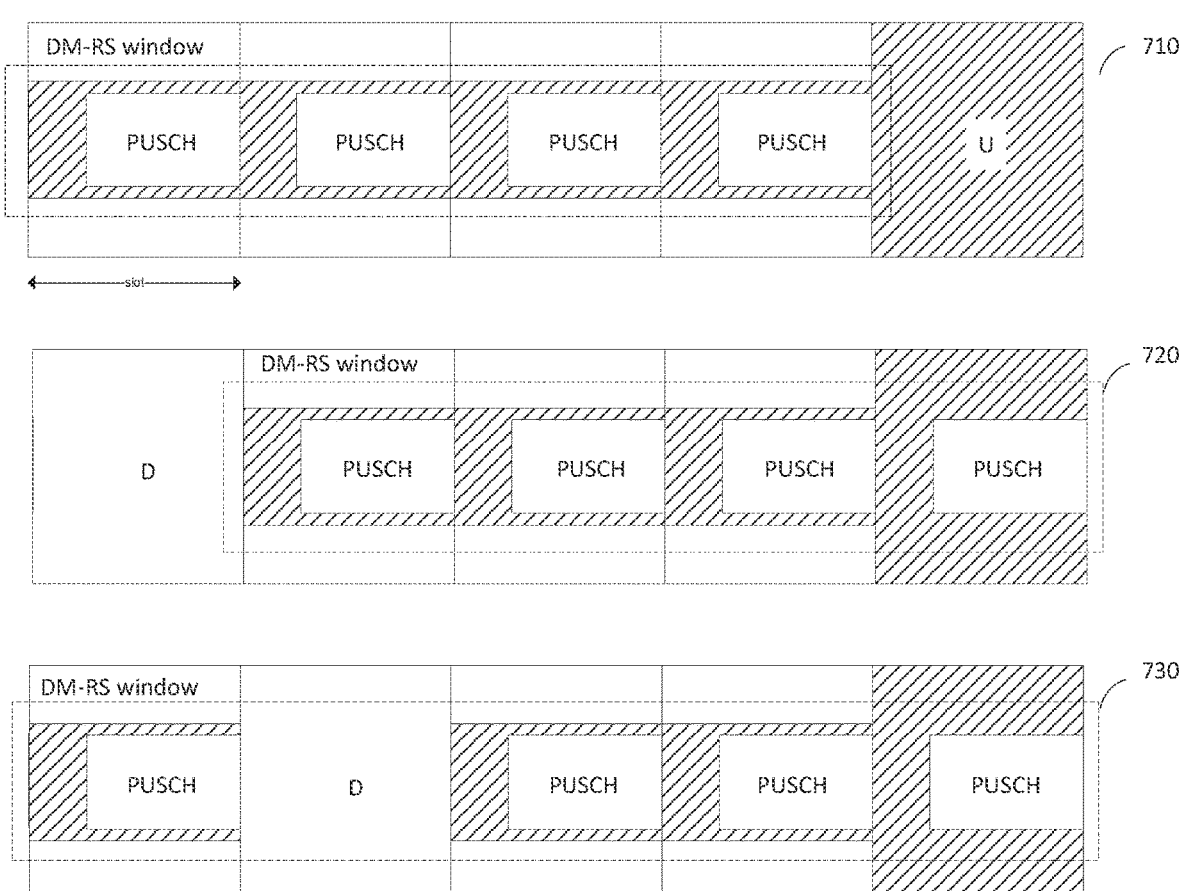
FIG. 7 illustrates an example of slots according to embodiments of the present disclosure.

FIG. 7 illustrates an example of slots 700 according to embodiments of the present disclosure. The embodiment of the example of slots 700 illustrated in FIG. 7 is for illustration only. FIG. 7 does not limit the scope of the present disclosure to any particular implementation of the example of slots 700.

When a UE is configured for operation in duplex mode and is configured or indicated by a DCI format for K PUSCH transmissions of repetition Type A or Type B, the PUSCH repetitions can be transmitted over a number of XDD slots or over a number of XDD and UL slots, and the slots may or may not be consecutive slots. The UE starts the transmission of the PUSCH in each slot from a first PRB and in a same starting symbol position. The length in number of symbols is same for all repetitions, independently if in XDD slots or UL slots, or the repetitions in XDD slots have a first length and the repetitions in UL slots have a second length.

In a first example illustrated in FIG. 7 the sub-band for UL in an XDD or SB slot is the middle part of the configured BWP and the UE is configured with transmission of a PUSCH with K=4 repetitions. In a first sub-example (in 710), all repetitions are over consecutive XDD slots. All 4 repetitions can be included in a DM-RS window and transmitted with a same transmit power. In a second sub-example (in 720), repetitions are over 3 XDD or SB slots and 1 UL slot. The repetition in the UL slot occupies the same sub-band with same first PRB as the repetitions in the XDD or SB slots. All 4 repetitions can be included in a DM-RS window and transmitted with a same transmit power associated with the SB. In a third sub-example (in 730), the repetitions in XDD or SB slots are over non-consecutive slots and whether non-consecutive slots can be part of a same DM-RS window depends on a UE requirement of a maximum transmission gap between two consecutive PUSCH repetitions over which the UE is able to maintain phase continuity. If the number of symbols between the last symbol of the PUSCH repetition in the first slot and the first symbol of the second repetition in the third slot is larger than a maximum transmission gap for the UE to maintain phase continuity, a first DM-RS window includes the first slot and a second DM-RS window includes $2^{nd}$, $3^{rd}$ and $4^{th}$ repetitions. If the $4^{th}$ repetition would utilize frequency resources from the whole BWP, the $4^1$ repetition would not be part of the DM-RS window that includes $2^{nd}$ and $3^{rd}$ repetitions. If the $4^{th}$ repetition would utilize frequency resources within the BWP and not overlapping with the frequency resources utilized by the $2^{nd}$ and $3^{rd}$ repetitions, the $4^1$ repetition would not be part of the DM-RS window that includes $2^{nd}$ and $3^{rd}$ repetitions.

The example of FIG. 7 also applies to a transmission of a PUCCH with repetitions and to a PUSCH transmission with a transport block (TB) processing over multiple slots. The example of FIG. 7 further applies when the BWP includes two sub-bands: an upper sub-band and a lower sub-band, and the UL sub-band is either the lower or the higher sub-band. UL and DL sub-bands include contiguous frequencies within the BWP.

Figure 8:
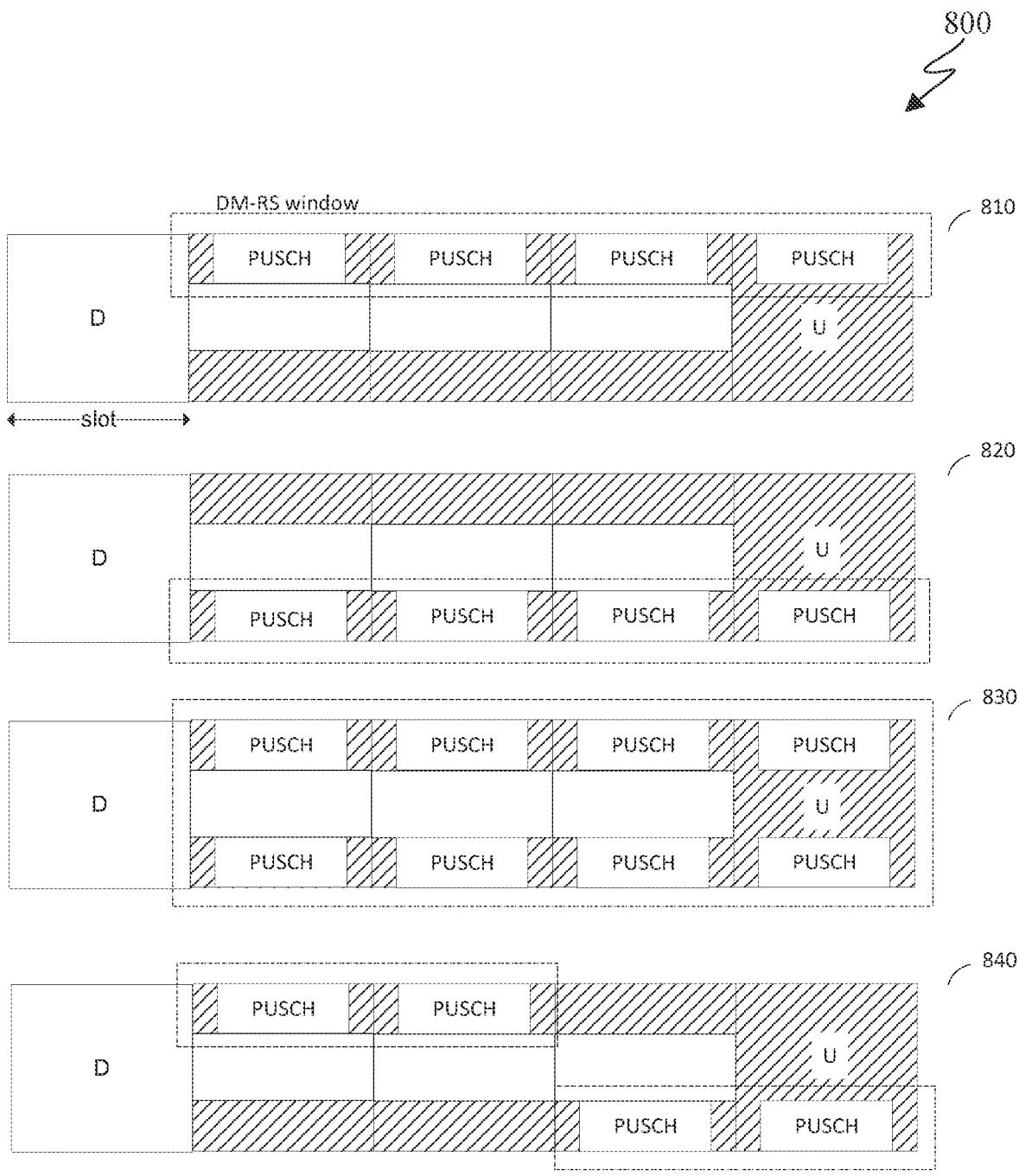
FIG. 8 illustrates another example of slots according to embodiments of the present disclosure.

FIG. 8 illustrates an example of slots 800 according to embodiments of the present disclosure. The embodiment of the example of slots 800 illustrated in FIG. 8 is for illustration only. FIG. 8 does not limit the scope of the present disclosure to any particular implementation of the example of slots 800.

In another example illustrated in FIG. 8, the sub-band for UL in an XDD slot includes an upper sub-band and a lower sub-band within the configured BWP, and the UE is configured with transmission of a PUSCH or PUCCH with K=4 repetitions or configured with TB processing over 4 slots. In a first sub-example (in 810), all repetitions in XDD and UL slots are scheduled in the upper sub-band of the BWP configured for UL in XDD slots. A DM-RS window can include all repetitions. In a second sub-example (in 820), all repetitions in XDD and UL slots are scheduled in the lower sub-band of the BWP configured for UL in XDD slots. A DM-RS window can include all repetitions. In a third sub-example (in 830), frequency resources scheduled for a repetition are in non-contiguous frequency ranges. A PUSCH symbol can utilize frequency resources in the lower sub-band and in the upper sub-band. The DM-RS is mapped in corresponding time/frequency resources in both sub-bands. In each sub-band, for all repetitions the UE starts the transmission from a first PRB in a same starting symbol position. The length in number of symbols is same for all repetitions, independently if in XDD slots or UL slots. The DM-RS window includes all 4 repetitions and the transmit power of all PUSCH symbols within the DM-RS window is the same. In a fourth sub-example (in 840), transmissions on an UL sub-band are included in a first DM-RS window and transmission on another UL sub-band are included in a second DM-RS window. DM-RS symbols are included in each sub-band. First and second PUSCH repetitions in the first DM-RS window in the upper UL sub-band are transmitted with a first transmit power, and third and fourth repetitions in the lower UL sub-band are transmitted with a second transmit power. Thus, the UE transmits PUSCH repetitions with frequency hopping interval of 2 slots with respective transmit power, and the frequency resources in each hop are within the lower and upper sub-band, respectively.

A UE applies a same power to all repetitions within a DM-RS window and applies a different power to repetitions when the window changes, wherein the different power is calculated by applying a closed-loop power control adjustment state that is updated using TPC commands accumulated during the previous DM-RS window when first and second DM-RS windows are within the same sub-band, otherwise the powers are calculated independently in each sub-band. If a last slot of a first DM-RS window and a first slot of a second DM-RS window are not consecutive slots, and a one or more TPC commands are received after the end of the first window and the start of the second window, the closed-loop power control adjustment state used to calculate the transmit power of PUSCH or PUCCH repetitions transmitted in the second window can also accumulate the one or more TPC commands received after the end of the first DM-RS window and the start of the second DM-RS window. The one or more TPC commands received after the end of the first DM-RS window and the start of the second DM-RS window can be TPC commands received in a DCI format 2_2 with CRC scrambled by TPC-PUSCH-RNTI.

In a first slot of a DM-RS window, a UE transmits a first PUSCH repetition with a power calculated by applying a closed-loop power control adjustment state that is updated using TPC commands accumulated in a time period up to a slot immediately preceding the first slot or up to a slot preceding the first slot of a number of slots. The closed-loop power control adjustment state used to calculate the transmit power of the first PUSCH repetition in the first slot transmitted in an UL sub-band can also accumulate a TPC command that is received in the first slot in a DL sub-band, subject to a constraint of a minimum number of symbols between the last symbol of the TPC command and the first symbol of the first PUSCH transmission. The minimum number of symbols can be a fixed value or can be a configured value, and can be subject to a UE capability. The minimum value can depend on the UL and DL sub-bands of the BWP. The value of the minimum number of symbols can be any value, included the value zero. If the value is 13 symbols, TPC commands received in the same slot of the PUSCH transmission are not accumulated in the closed-loop power control adjustment state used to calculate the transmit power of the PUSCH repetition.

Figure 9:
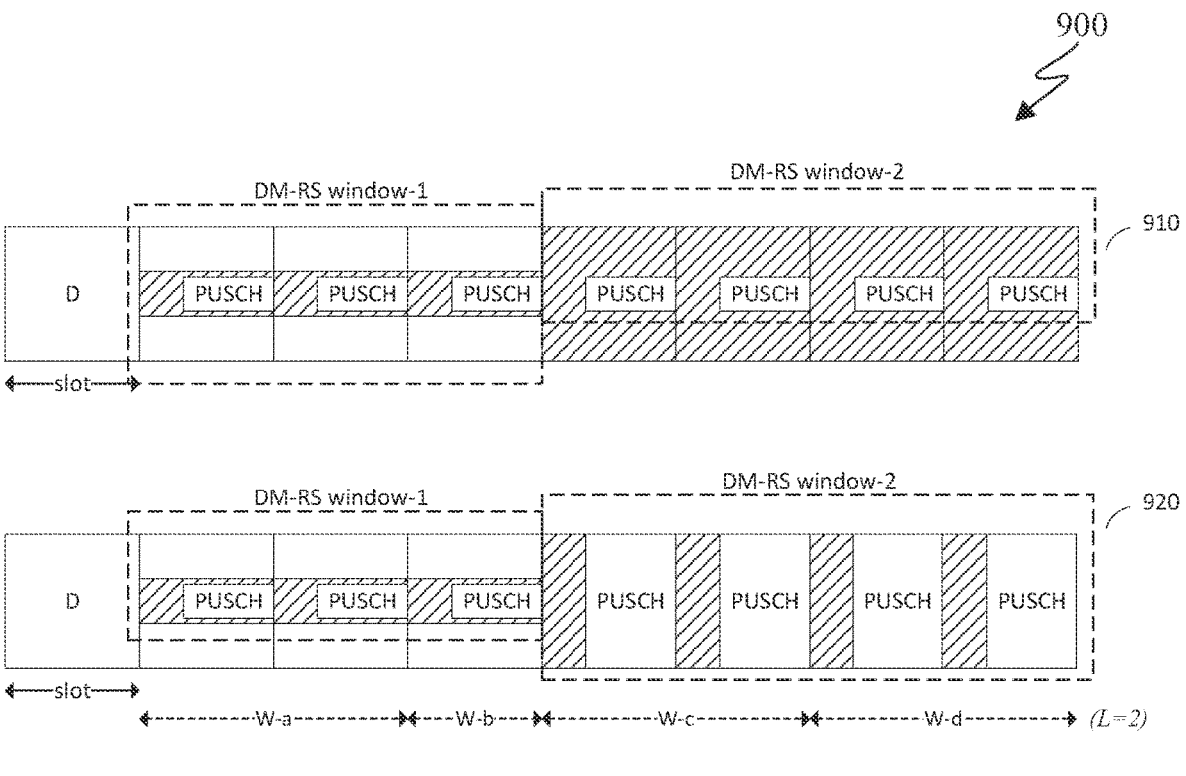
FIG. 9 illustrates yet another example of slots according to embodiments of the present disclosure.

FIG. 9 illustrates an example of slots 900 according to embodiments of the present disclosure. The embodiment of the example of slots 900 illustrated in FIG. 9 is for illustration only. FIG. 9 does not limit the scope of the present disclosure to any particular implementation of the example of slots 900.

When a UE is configured to operate in XDD mode and is also configured with DM-RS bundling over a number of slots, a DM-RS window can include XDD slots and/or UL slots. The DM-RS bundling configuration can provide information on whether DM-RS bundling is enabled for PUSCH transmissions scheduled in the BWP (in UL slots) and/or for transmissions scheduled in sub-band(s) of the configured BWP (in XDD slots). It can also indicate whether a DM-RS window can include both XDD and UL slots, or all slots in a window need to be either UL slots or XDD slots. When DM-RS bundling is enabled, a length of the DM-RS bundling window in time domain may also be configured. Separate configurations for DM-RS bundling operation in XDD mode, or equivalently for operation over XDD or SB slots, and for operation in non-XDD mode, or equivalently for operation over UL slots, can be provided.

When a UE is configured with XDD operation and with DM-RS bundling, the number of slots over which the UE transmits repetitions with same power depends on whether the UE is also configured a length of the DM-RS window for XDD mode and/or for non-XDD mode and whether a same DM-RS window can include both XDD and UL slots. For example, as illustrated in FIG. 9, the UE is scheduled to transmit a PUSCH with K=7 repetitions, wherein the first 3 repetitions are scheduled in XDD slots, and the remaining 4 repetitions are scheduled in UL slots.

When all 7 repetitions are scheduled in frequency resources of a same sub-band (as in 910), independently on whether the slot is an XDD slot or an UL slot, all 7 repetitions can be part of the same DM-RS window and transmitted with same power associated with the sub-band. Whether to use one or more DM-RS windows can depend on a configuration of the DM-RS window length, if provided. For example, if the configured window length L is smaller than 7 slots, a first window would include L consecutive slots and the remaining slots would be part of one or more subsequent windows with each window including L or fewer slots. It is also possible that whether to use single or multiple DM-RS windows for repetitions that are scheduled on a same sub-band over XDD slots and UL slots (as in 910) depends on a semi-static and/or dynamic indication of a slot format. In different DM-RS windows for XDD slots and UL slots as illustrated in 910, the power is calculated based on a TPC procedure associated with the sub-band for transmission in an XDD slot or associated with the BWP for transmission in an UL slot.

When a first number of repetitions is scheduled over a first interval of frequency resources and a second number of repetitions is scheduled over a second interval of frequency resources, wherein the first interval and the second interval may or may not partially overlap, the first number of repetitions would be part of a first DM-RS window and transmitted with a first power and the second number of repetitions would be part of a second DM-RS window and transmitted with a second power (as in 920). First and second powers are calculated based on TPC parameters associated with the sub-band and to the UL band, respectively. Thus, a different interval or size of frequency resources used in PUSCH transmissions of PUSCH scheduled by a DCI format 0_1 or 0_2, or PUSCH repetition Type A with a configured grant, or PUSCH repetition Type B or TB processing over multiple slots or PUCCH transmissions of repetition constitutes an event that causes power consistency and phase continuity not to be maintained across PUSCH transmissions of PUSCH repetition, or PUCCH transmissions of PUCCH repetition. If the UE is configured with a window length L smaller than the first and/or the second number of slots, each DM-RS window includes L or fewer slots. For example, if L=2, there are 4 DM-RS windows over the 7 slots with the 7 repetitions.

A DCI format that schedules repetitions over different intervals or sizes of frequency resources, for example as in 920 of FIG. 9, the first number of repetitions occupies a sub-band of the BWP with size F1 and the second number of repetitions occupies the entire BWP with size F2, has a frequency domain resource assignment (FDRA) field that includes a first number of bits ($X_{rep1}$ bits) determined assuming that, in the following descriptions, $$N_{RB}^{UL,BWP}$$

is the size of F1 and MSB and LSB refer to the $X_{rep1}$ bits, and a second number of bits ($X_{rep2}$ bits) determined assuming that, in the following descriptions, $$N_{RB}^{UL,BWP}$$

is the size of F2 and MSB and LSB refer to the $X_{rep2}$ bits. Alternatively, the DCI format can include a first FDRA field including $X_{rep1}$ bits for scheduling in the sub-band and a second FDRA field including $X_{rep2}$ bits for scheduling in the entire BWP. Also, in the following descriptions, the higher layer parameter useInterlacePUCCH-PUSCH, if configured, can be provided in the configuration of the XDD slot for the configured UL sub-band. If more than one UL sub-bands are configured for an XDD or SB-FD slot, the higher layer parameter can apply to all UL sub-bands or can be separately configured for each UL sub-band, or can also be provided in the configuration of a DL BWP and apply to UL sub-band(s) if UL sub-bands are configured in the DL BWP, wherein the sub-band can occupy part of or the entire DL BWP. For UL slots, useInterlacePUCCH-PUSCH can be provided in BWP-UplinkDedicated.

The values of the first and second number of bits, $X_{rep1}$ and $X_{rep2}$, for frequency domain resource assignment are then each determined as follows:

If higher layer parameter useInterlacePUCCH-PUSCH is not configured $N_{RBG}$ bits if only resource allocation type 0 is configured, where $N_{RBG}$ is defined in Clause 6.1.2.2.1 of TS 38.214, $$\lceil \log_2(N_{RB}^{UL,BWP}(N_{RB}^{UL,BWP} + 1)/2) \rceil$$

bits if only resource allocation type 1 is configured, or $$\max(\lceil \log_2(N_{RB}^{UL,BWP}(N_{RB}^{UL,BWP} + 1)/2) \rceil, N_{RBG}) + 1$$

bits if resourceAllocation is configured as 'dynamicSwitch'.

If resourceAllocation is configured as 'dynamicSwitch', the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Clause 6.1.2.2.1 of TS 38.214.

For resource allocation type 1, the $$\lceil \log_2(N_{RB}^{UL,BWP}(N_{RB}^{UL,BWP} + 1)/2) \rceil$$

LSBs provide the resource allocation as follows:

For PUSCH hopping with resource allocation type 1:

$N_{UL\_hop}$ MSB bits are used to indicate the frequency offset according to Clause 6.3 of TS 38.214, where $N_{UL\_hop}=1$ if the higher layer parameter frequency-HoppingOffsetLists contains two offset values and $N_{UL\_hop}=2$ if the higher layer parameter frequency-HoppingOffsetLists contains four offset values $$\lceil \log_2(N_{RB}^{UL,BWP}(N_{RB}^{UL,BWP} + 1)/2) \rceil - N_{UL\_hop}$$

bits provide the frequency domain resource allocation according to Clause 6.1.2.2.2 of TS 38.214

For non-PUSCH hopping with resource allocation type 1:

$$\lceil \log_2(N_{RB}^{UL,BWP}(N_{RB}^{UL,BWP} + 1)/2) \rceil - N_{UL\_hop}$$

bits provide the frequency domain resource allocation according to Clause 6.1.2.2.2 of TS 38.214.

If "Bandwidth part indicator" field indicates a bandwidth part other than the active bandwidth part and if resourceAllocation is configured as 'dynamicSwitch' for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part. For an XDD or SB-FD configuration, the "active bandwidth" can refer to the UL sub-band, and the indicated bandwith part configured as 'dynamicSwitch' can refer to a different sub-band than the "active bandwidth" within the same bandwidth part or can refer to the entire bandwith part that includes the "active UL sub-band". It is possible that the indicated bandwidth part is a bandwidth that does not include the sub-band the "active UL sub-band". It is also possible that the indicated bandwidth part is an UL bandwidth part that cannot be configured with UL sub-bands. The above descriptions also apply when the active bandwidth part is an UL bandwidth part and the indicated bandwidth part is an UL sub-band.

If the higher layer parameter useInterlacePUCCH-PUSCH is configured

5+Y bits provide the frequency domain resource allocation according to Clause 6.1.2.2.3 of TS 38.214 if the subcarrier spacing for the active UL bandwidth part is 30 kHz. The 5 MSBs provide the interlace allocation and the Y LSBs provide the RB set allocation.

6+Y bits provide the frequency domain resource allocation according to Clause 6.1.2.2.3 of TS 38.214 if the subcarrier spacing for the active UL bandwidth part is 15 kHz. The 6 MSBs provide the interlace allocation and the Y LSBs provide the RB set allocation.

The value of Y is determined by $$\left\lceil \log_2\left( \frac{N_{RB-set,UL}^{BWP}\left(N_{RB-set,UL}^{BWP}+1\right)}{2} \right) \right\rceil$$

where $$N_{RB-set,UL}^{BWP}$$

is the number of RB sets contained in the active UL BWP as defined in clause 7 of TS38.214.

A DCI format that schedules a PUSCH with repetitions over different intervals or sizes of a bandwidth, for example as in 920 of FIG. 9 over frequencies within a SB of a BWP and within the BWP, includes a time domain resource assignment field that can indicate one number of repetitions, or can indicate a first and a second numbers of repetitions in case a first and second UL bandwidth sizes of F1 and F2 are used, respectively. When one number of repetitions is indicated for transmission of repetitions over a first and second numbers of slots that are configured with two UL bandwidth sizes that may or may not overlap, the frequency resource assignment would include a first number of bits for frequency resource assignment for slots with the first slot configuration and a second number of bits for frequency resource assignment for slots with the second slot configuration. For example, in 920 of FIG. 9, the UE is indicated to transmit a PUSCH with 7 repetitions in the 7 consecutive slots, of which the first 3 slots are XDD or SB-FD slots with a single UL sub-band of size F1 and the last 4 slots are UL slots with bandwidth of size F2. The frequency domain resource assignment field of the DCI format includes a first number of bits that are determined using F1 as the size of the UL bandwidth for PUSCH transmissions in the first 3 slots and a second number of bits that are determined using F2 as the size of the UL bandwidth for PUSCH transmissions in the last 4 slots. In another example, the UE is scheduled or configured to transmit 4 repetitions in 4 slots, wherein the first 3 slots are XDD or SB-FD slots with a sub-band of size F1 and the last slot is an UL slot of size F2, and the frequency domain resource assignment field of the DCI format includes the first number of bits determined using F1 and the second number of bits determined using F2.

It is possible that the DCI format that schedules a PUSCH with repetitions over a number of slots in different intervals or sizes of a bandwidth, for example in a SB of a BWP and in a BWP, includes a bit field that can be 0 or 1, wherein 1 indicates that the frequency domain resource assignment field of the DCI format includes resource allocation for more than one bandwidth sizes, and 0 indicates that the frequency domain resource assignment field of the DCI format includes resource allocation for one bandwidth size, or vice versa.

It is also possible that the UE is provided by a higher layer parameter a configuration to enable PUSCH transmission of PUSCH repetition over a number of slots with frequency domain resources allocated within different bandwidth sizes for the different repetitions.

Figure 10:
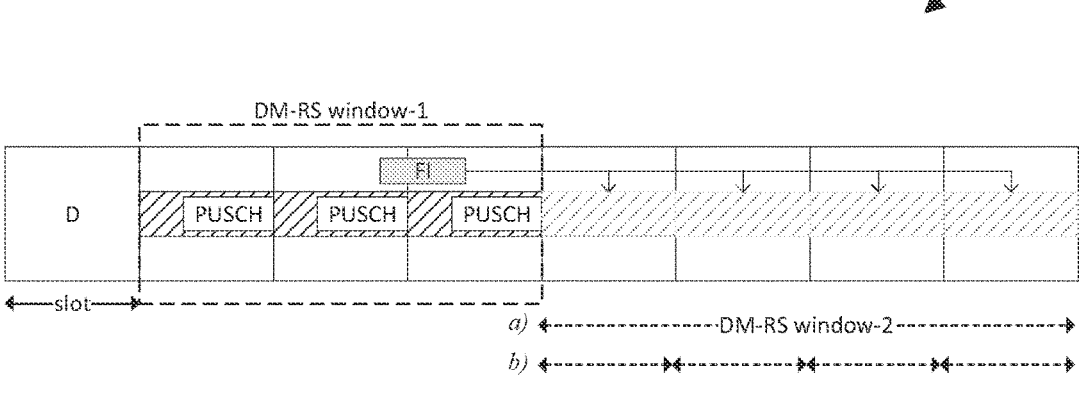
FIG. 10 illustrates an example of a slot including a dynamic slot format indication according to embodiments of the present disclosure.

FIG. 10 illustrates an example of a slot including a dynamic slot format indication 800 according to embodiments of the present disclosure. The embodiment of the example of a slot including a dynamic slot format indication 1000 illustrated in FIG. 10 is for illustration only. FIG. 10 does not limit the scope of the present disclosure to any particular implementation of the example of a slot including a dynamic slot format indication 1000.

As illustrated in FIG. 10, slots 2, 3 and 4 are configured as XDD slots, and frequency resources in a sub-band of the BWP can be used for UL and frequencies resources outside the sub-band can be used for DL. For PUSCH transmission of PUSCH repetitions scheduled by DCI format 0_1 or DCI format 0_2, or for PUSCH transmission of TB processing over multiple slots, or for PUSCH transmission of PUSCH repetitions with a configured grant, PUSCH transmissions in slots 2, 3 and 4, can be included in a first DM-RS window. Slots 5 to 8 are configured as DL slots but symbols of these slots in a sub-band can be used as UL symbols if the UE receives a slot format indication for the sub-band (SFI-SB or FI) in a DCI format that indicates the direction as UL. In absence of the FI indication, the symbols in the sub-band are DL symbols. A gNB can configure such slots as DL by a TDD UL-DL configuration and additionally configure a sub-band in DL slots as flexible. In FIG. 10, in slot 4 the UE receives a slot format indication for the sub-band in a DCI format for slots 5 to 8. Then symbols in the sub-band in slots 5 to 8 can be used for UL transmissions. For example, if the UE is scheduled to transmit a PUSCH with K=7 repetitions, repetitions can be scheduled in slots 5 to 8 and be included in a second DM-RS window (as in a) in FIG. 10). First and second DM-RS windows include repetitions over a same sub-band, but slots that are dynamically indicated as UL slot in that sub-band are included in a separate DM-RS window. It is also possible that repetitions over slots that are dynamically indicated as UL slots in the sub-band are not included in a DM-RS window (as in b) in FIG. 10), and the transmit power of each repetition is determined according to the transmit power control procedure, wherein the transmit power is calculated for each repetition based on parameters associated with the corresponding bandwidth (e.g., the SB of the BWP as in FIG. 10, or the entire BWP) indicated or configured as UL.

A slot format indication for a sub-band in a DCI format indicates to the UE the slot format for the sub-band over a first number of slots starting from the slot after the slot where the DCI format is received, or starting after a second number of slots from the slot where the DCI format is received. It is also possible that the starting slot for the indicated slot format is the slot where the UE detects the DCI format. For example, if the DCI format is detected in the first symbols of the slot that are DL symbols over all frequency resources in the BWP, the indicated format applies to symbols after the first symbols of the slot that can have different directions in different sub-bands.

FIG. 11 illustrates an example method 1100 for a UE to determine a PUSCH transmission with repetitions when DM-RS bundling is enabled, and a slot format is indicated in a DCI format according to embodiments of the present disclosure. The embodiment of the method 1100 for a UE to determine a PUSCH transmission with repetitions when DM-RS bundling is enabled, and a slot format is indicated in a DCI format illustrated in FIG. 11 is for illustration only. FIG. 11 does not limit the scope of the present disclosure to any particular implementation of the method 1100 for a UE to determine a PUSCH transmission with repetitions when DM-RS bundling is enabled, and a slot format is indicated in a DCI format.

As illustrated in FIG. 11, at step 1110, a UE (such as the UE 116) is configured a first number of slots as XDD slots, wherein a first sub-band is for UL and a second sub-band is for DL, and a second number of slots as DL. For example, the first and second sub-bands can be as illustrated in 640 of FIG. 6. At step 1120, the UE is configured/indicated to transmit a PUSCH with K repetitions, wherein K is larger than the first number of slots, and is configured with DM-RS bundling. At step 1130, the UE receives a DCI format including an UL indication for the first sub-band for each slot over the second number of slots. At step 1140, the UE transmits PUSCH repetitions over the first number of slots in frequency resources of the first sub-band using a first transmit power. At step 1150, the UE transmits PUSCH repetitions over the second number of slots using a second transmit power.

In step 1130, the indication in the DCI format can be received in the slot preceding the first slot of the second number of slots and indicate to the UE the slot format for the sub-band for each slot in the second number of slots starting from the first slot of the second number of slots. Symbols of each slot of the second number of slots can be originally configured as DL symbols or as flexible symbols by a TDD UL-DL slot format configuration, and upon reception of the indication in the DCI format, DL or flexible symbols of the second number of slots can be used as UL symbols in the sub-band. The indication in the DCI format can indicate as UL the symbols in a sub-band that is originally configured as flexible. It is possible that the indication in the DCI format includes also information of which sub-band among a number of sub-bands of the BWP can be used as UL. It is also possible that the indication in the DCI format can indicate as DL the symbols in a sub-band that is originally configured as UL or flexible.

In the example of FIG. 11, the slot format of the second number of slots are indicated by a DCI format and repetitions over the second number of slots are included in the second DM-RS window. Alternatively, transmissions over a same sub-band over K slots, wherein the sub-band is configured as UL over a first number of slots of the K slots and is indicated as UL by a DCI format over a second number of slots of the K slots, can be included in a same DM-RS window and transmitted with a same power.

FIG. 12 illustrates an example method 1200 for a UE to determine a PUSCH transmission with repetitions over slots with a slot format indicated by a DCI format according to embodiments of the present disclosure. The embodiment of the method 1200 for a UE to determine a PUSCH transmission with repetitions over slots with a slot format indicated by a DCI format illustrated in FIG. 12 is for illustration only. FIG. 12 does not limit the scope of the present disclosure to any particular implementation of the method 1200 for a UE to determine a PUSCH transmission with repetitions over slots with a slot format indicated by a DCI format.

As illustrated in FIG. 12, at step 1210, a UE (such as the UE 116) is configured a first number of slots as XDD slots, wherein a first sub-band is for UL and a second sub-band is for DL, and a second number of slots as DL slots. At step 1220, the UE is configured/indicated to transmit a PUSCH with K repetitions, wherein K is larger than the first number of slots, and is configured with DM-RS bundling. At step 1230, the UE receives a DCI format including an UL indication for the first sub-band for each slot over the second number of slots. At step 1240, the UE transmits PUSCH repetitions over the first number of slots in frequency resources of the first sub-band using a first transmit power. At step 1250, the UE transmits PUSCH repetitions over the second number of slots using corresponding transmit powers according to a transmit power control procedure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
    receive information for:
        first slots that include first symbols associated with first frequency resources of a sub-band (SB),
        second slots that include second symbols associated with second frequency resources of a bandwidth (BW), wherein the BW includes the SB, and
        transmission of a channel over a first number of slots including slots from the first slots and the second slots; and
a processor operably coupled to the transceiver, the processor configured to determine:
    a first set of frequency resources within the SB for transmission of the channel over at least one slot from the first slots, and
        a second set of frequency resources within the BW for transmission of the channel over at least one slot from the second slots,
wherein the transceiver is further configured to transmit the channel:
    in the first set of frequency resources within the SB over the at least one slot from the first slots, and in the second set of frequency resources within the BW over the at least one slot from the second slots, wherein the second set of frequency resources within the BW occupies a frequency band, and wherein the frequency band of the second set of frequency resources:

has a same size as a frequency band of the first set of frequency resources within the SB, and overlaps with the frequency band of the first set of frequency resources within the SB.

2. The UE of claim 1, wherein:

the channel is a physical uplink shared channel (PUSCH);

the transmission of the PUSCH includes one of:

a number of repetitions over one or more slots, or a transport block over more than one slot; and the transceiver is further configured to transmit, over the first number of slots:

the PUSCH with the number of repetitions over one or more slots, or the PUSCH with the transport block over the more than one slot.

3. The UE of claim 1, wherein:

the first set of frequency resources within the SB overlaps with the second set of frequency resources within the BW, and the second set of frequency resources within the BW occupies a frequency band that is not smaller than the frequency band of the first set of frequency resources.

4. The UE of claim 3, wherein:

the second set of frequency resources within the BW occupies a frequency band of a same size as the frequency band of the first set of frequency resources;

the transceiver is further configured to receive information for enabling a demodulation reference signal (DM-RS) bundling operation over a nominal time domain window (TDW);

the processor is further configured to determine:

a second number of slots for a length of the nominal TDW, a first TDW that includes a third number of consecutive slots from the first slots and the second slots, wherein the third number is not larger than the second number, a first power associated with a first transmission occasion of the channel in the first TDW; and the transceiver is further configured to transmit the channel with the first power in the first transmission occasion in the first TDW.

5. The UE of claim 1, wherein:

the processor is further configured to determine:

a first power of the channel in a first transmission occasion in the first slots based on transmit power control (TPC) parameters associated with the SB, and a second power of the channel in a second transmission occasion in the second slots based on TPC parameters associated with the BW; and the transceiver is further configured to transmit the channel with:

the first power in the first transmission occasion in the first set of frequency resources within the SB, and the second power in the second transmission occasion in the second set of frequency resources within the BW.

6. The UE of claim 1, wherein the transceiver is further configured to receive information for enabling a demodulation reference signal (DM-RS) bundling operation over a nominal time domain window (TDW);

the processor is further configured to determine:

a second number of slots for a length of the nominal TDW, a first TDW including a third number of consecutive slots from the first slots, a second TDW including a fourth number of consecutive slots from the second slots, wherein:

the sum of the third number and the fourth number is not smaller than the first number, and the third number or the fourth number is not larger than the second number, a first power associated with a first transmission occasion of the channel in the first TDW, and a second power associated with a second transmission occasion of the channel in the second TDW; and the transceiver is further configured to transmit the channel with:

the first power in the first transmission occasion in the first TDW, and the second power in the second transmission occasion in the second TDW.

7. A base station (BS) comprising:

a transceiver configured to transmit information for:

first slots that include first symbols associated with first frequency resources of a sub-band (SB), second slots that include second symbols associated with second frequency resources of a bandwidth (BW), wherein the BW includes the SB, and reception of a channel over a first number of slots including slots from the first slots and the second slots; and a processor operably coupled to the transceiver, the processor configured to determine:

a first set of frequency resources within the SB for reception of the channel over at least one slot from the first slots, and a second set of frequency resources within the BW for reception of the channel over at least one slot from the second slots, wherein the transceiver is further configured to receive the channel:

in the first set of frequency resources within the SB over the at least one slot from the first slots, and in the second set of frequency resources within the BW over the at least one slot from the second slots, wherein the second set of frequency resources within the BW occupies a frequency band, and wherein the frequency band of the second set of frequency resources:

has a same size as a frequency band of the first set of frequency resources within the SB, and overlaps with the frequency band of the first set of frequency resources within the SB.

8. The BS of claim 7, wherein:

the channel is a physical uplink shared channel (PUSCH);

the reception of the PUSCH includes one of:

a number of repetitions over one or more slots, or a transport block over more than one slot; and the transceiver is further configured to receive, over the first number of slots:

the PUSCH with the number of repetitions over one or more slots, or the PUSCH with the transport block over the more than one slot.

9. The BS of claim 7, wherein:

the first set of frequency resources within the SB overlaps with the second set of frequency resources within the BW, and the second set of frequency resources within the BW occupies a frequency band that is not smaller than the frequency band of the first set of frequency resources.

10. The BS of claim 9, wherein:

the second set of frequency resources within the BW occupies a frequency band of a same size as the frequency band of the first set of frequency resources;

the transceiver is further configured to transmit information for enabling a demodulation reference signal (DM-RS) bundling operation over a nominal time domain window (TDW);

the processor is further configured to determine:

a second number of slots for a length of the nominal TDW, a first TDW that includes a third number of consecutive slots from the first slots and the second slots, wherein the third number is not larger than the second number, a first power associated with a first reception occasion of the channel in the first TDW; and the transceiver is further configured to receive the channel with the first power in the first reception occasion in the first TDW.

11. The BS of claim 7, wherein:

the transceiver is further configured to transmit information for enabling demodulation reference signal (DM-RS) bundling operation over a nominal time domain window (TDW);

the processor is further configured to determine:

a second number of slots for a length of the nominal TDW, a first TDW including a third number of consecutive slots from the first slots, a second TDW including a fourth number of consecutive slots from the second slots, wherein:

the sum of the third number and the fourth number is not smaller than the first number, and the third number or the fourth number is not larger than the second number, a first power associated with a first reception occasion of the channel in the first TDW, and a second power associated with a second reception occasion of the channel in the second TDW; and the transceiver is further configured to receive the channel with:

the first power in the first reception occasion in the first TDW, and the second power in the second reception occasion in the second TDW.

12. A method comprising:

receiving information for:

first slots that include first symbols associated with first frequency resources of a sub-band (SB), second slots that include second symbols associated with second frequency resources of a bandwidth (BW), wherein the BW includes the SB, and transmission of a channel over a first number of slots including slots from the first slots and the second slots;

determining:

a first set of frequency resources within the SB for transmission of the channel over at least one slot from the first slots, and a second set of frequency resources within the BW for transmission of the channel over at least one slot from the second slots; and transmitting the channel:

in the first set of frequency resources within the SB over the at least one slot from the first slots, and in the second set of frequency resources within the BW over the at least one slot from the second slots, wherein the second set of frequency resources within the BW occupies a frequency band, and wherein the frequency band of the second set of frequency resources:

has a same size as a frequency band of the first set of frequency resources within the SB, and overlaps with the frequency band of the first set of frequency resources within the SB.

13. The method of claim 12, wherein:

the channel is a physical uplink shared channel (PUSCH);

the transmission of the PUSCH includes one of:

a number of repetitions over one or more slots, or a transport block over more than one slot; and transmitting the channel further comprises transmitting, over the first number of slots:

the PUSCH with the number of repetitions over one or more slots, or the PUSCH with the transport block over the more than one slot.

14. The method of claim 12, wherein:

the first set of frequency resources within the SB overlaps with the second set of frequency resources within the BW, and the second set of frequency resources within the BW occupies a frequency band that is not smaller than the frequency band of the first set of frequency resources.

15. The method of claim 14, wherein the second set of frequency resources within the BW occupies a frequency band of a same size as the frequency band of the first set of frequency resources, the method further comprising:

receiving information for enabling a demodulation reference signal (DM-RS) bundling operation over a nominal time domain window (TDW); and determining:

a second number of slots for a length of the nominal TDW, a first TDW that includes a third number of consecutive slots from the first slots and the second slots, wherein the third number is not larger than the second number, and a first power associated with a first transmission occasion of the channel in the first TDW, wherein transmitting the channel further comprises transmitting the channel with the first power in the first transmission occasion in the first TDW.

16. The method of claim 12, further comprising:

determining:

a first power of the channel in a first transmission occasion in the first slots based on transmit power control (TPC) parameters associated with the SB, and a second power of the channel in a second transmission occasion in the second slots based on TPC parameters associated with the BW, wherein transmitting the channel further comprises transmitting the channel with:

the first power in the first transmission occasion in the first set of frequency resources within the SB, and the second power in the second transmission occasion in the second set of frequency resources within the BW.

17. The method of claim 12, further comprising:

receiving information for enabling a demodulation reference signal (DM-RS) bundling operation over a nominal time domain window (TDW); and determining:

a second number of slots for a length of the nominal TDW, a first TDW including a third number of consecutive slots from the first slots, a second TDW including a fourth number of consecutive slots from the second slots, wherein:

the sum of the third number and the fourth number is not smaller than the first number, and the third number or the fourth number is not larger than the second number, a first power associated with a first transmission occasion of the channel in the first TDW, and a second power associated with a second transmission occasion of the channel in the second TDW, wherein transmitting the channel further comprises transmitting the channel with:

the first power in the first transmission occasion in the first TDW, and the second power in the second transmission occasion in the second TDW.

\* \* \* \* \*